Figure 1:
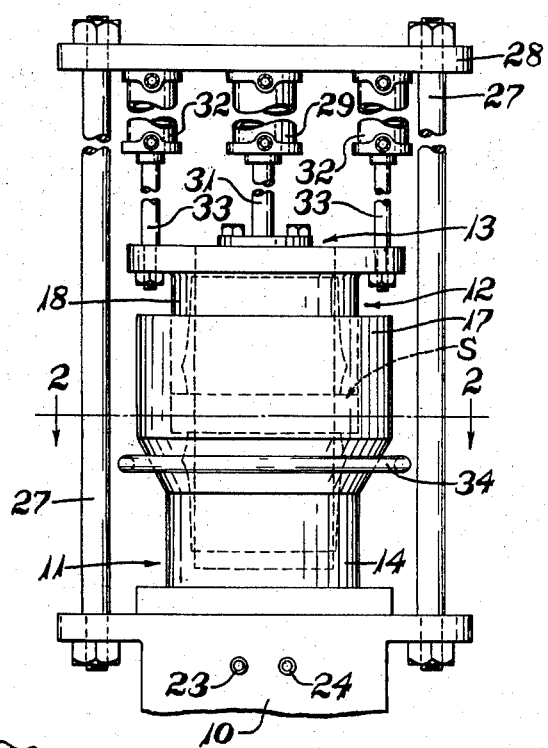

July 22, 1958 — O. E. HERMANNS — 2,843,880
APPARATUS FOR TRANSFER MOLDING
Filed Oct. 15, 1956 — 3 Sheets-Sheet 1

INVENTOR.
OTTO E. HERMANNS
BY C. E. Tripp
ATTY.

United States Patent Office 2,843,880
Patented July 22, 1958

2,843,880

APPARATUS FOR TRANSFER MOLDING

Otto E. Hermanns, Akron, Ohio, assignor to The B. F. Goodrich Company, New York, N. Y., a corporation of New York Application October 15, 1956, Serial No. 615,810

2 Claims. (Cl. 18—42)

This invention relates to the transfer molding of plastic stock, the term plastic stock or plastic material referring to thermoplastic and thermosetting materials such as those used in the rubber industry including natural and synthetic rubbers.

The practice of this invention will be described in connection with a forming or molding operation that produces a tire tread band. Tire tread bands are normally extruded from rubber-like material and are applied to the tire carcass during the tire building operation. The ends of the band are spliced producing a joint that might cause irregularities in the finished tire. In accordance with this invention, an endless tread band is formed from one or more slugs of rubber stock by transfer molding, whereupon the endless band is removed from the forming mold and applied to the carcass of the tire with the tread band in an unvulcanized or almost semi-vulcanized condition.

In transfer molding, as distinguished from compression molding and injection molding, a slug of stock of the proper volume or weight is placed in a multiple part mold and when the mold is closed the stock is moved or transferred from its initial position into the mold cavities so that when the mold is completely closed substantially all of the stock has been transferred to the mold cavities and the cavity where the unformed stock was placed initially is now occupied by a mold part.

The transfer molding of rubber stocks of this type wherein the stock is not vulcanized in the mold but is removed from the mold as an unvulcanized or possibly a semi-cured annular band is a delicate operation. Transfer molding of annular bands of unvulcanized stock has heretofore been unsatisfactory because the method or apparatus employed required the stock during the transfer operation to flow unequally, that is the stock would reverse its direction in part so that certain portions of the stock would first move in one direction and then move or fold back upon themselves to attain their final position. If the article is to be cured or vulcanized in the transfer mold, this is not serious because all the folds or areas of complete or partial delineation due to stock flow disappear during the curing process and in the molded article is homogeneous. However, if the same article is removed before vulcanization from such apparatus, distortion or even separation occurs as a result of the unequal flow of stock during the transfer operation, either during removal of the article from the mold or during subsequent operations on the article.

In accordance with this invention, substantially axially symmetrical mold or stock forming cavities are always presented to the unformed stock from the time the mold first closes upon the unformed plies of stock until the stock is entirely transferred into the forming or mold cavities, resulting in a transfer operation wherein the flow of the stock has been symmetrical and not reversed upon itself. The advantages of this have been explained.

The manner in which one skilled in the art may practice my invention is explained in the following specification and illustrated in the drawings.

Figure 7:
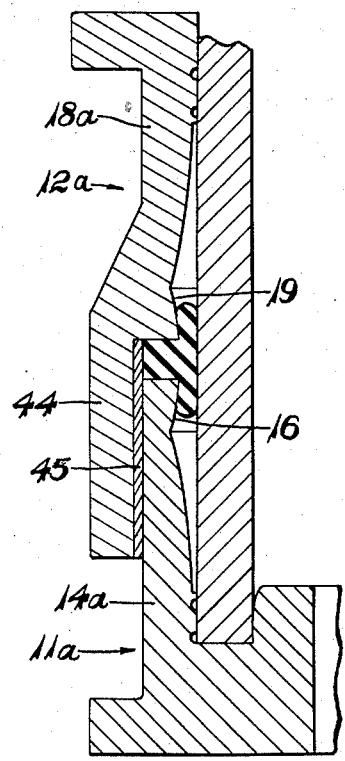
Figure 2:
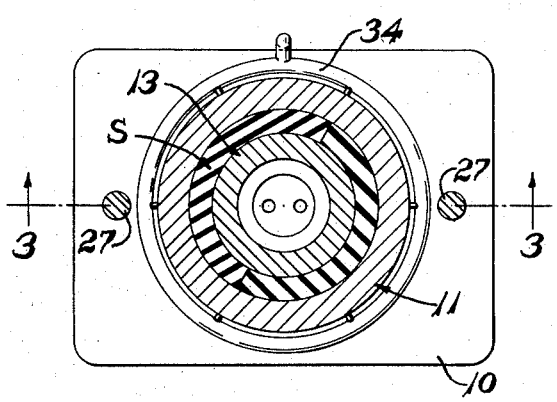
Figure 3:
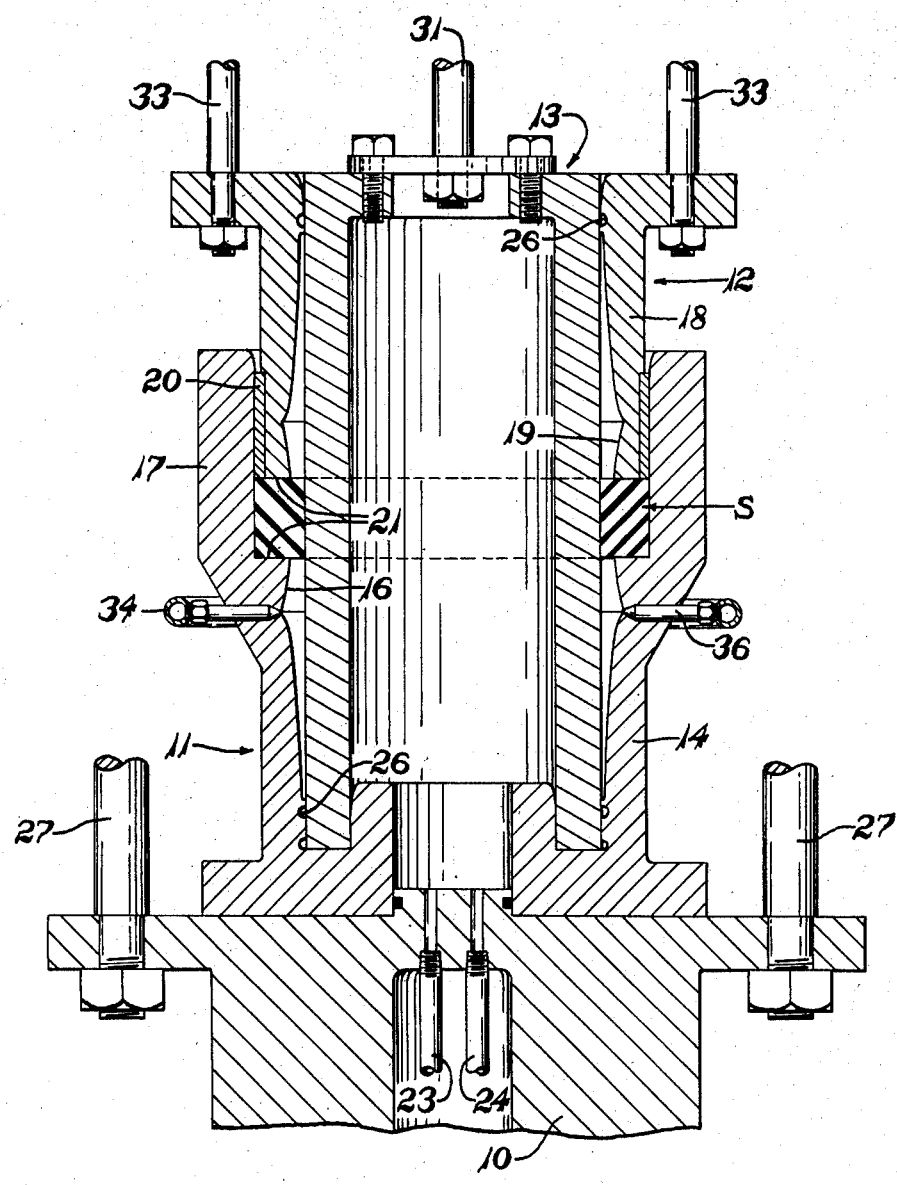
Figure 4:
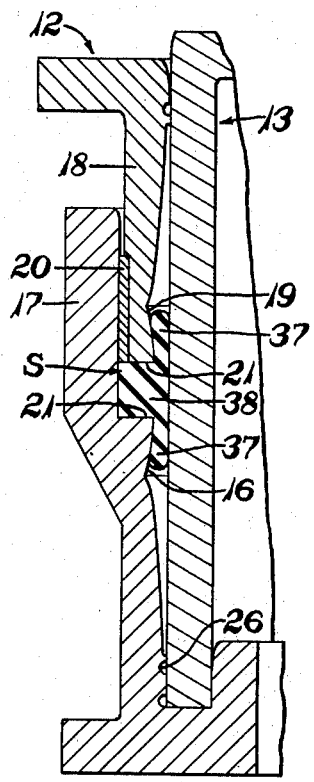
Figure 5:
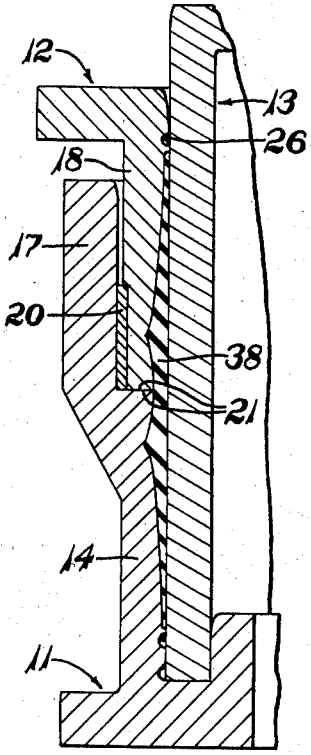
Figure 6:
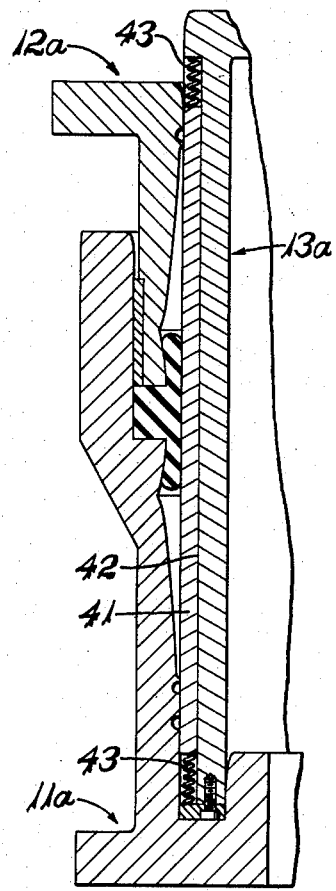

In the drawings, Fig. 1 is an elevation of the apparatus. Fig. 2 is a section taken on 2—2 of Fig. 1. Fig. 3 is a vertical section taken on 3—3 of Fig. 2. Fig. 4 is a partial vertical section with the mold partially closed upon the stock. Fig. 5 shows the mold fully closed. Fig. 6 is a similar section of a modified form showing a floating die part. Fig. 7 is a similar section of another modified form of the apparatus.

Referring to Figs. 1 to 3, the apparatus includes a base 10 mounting a lower mold shell member 11 which telescopes with an upper shell member 12. Slidingly fitting within members 11 and 12 is a generally cylindrical core member 13. The lower mold shell 11 has a wall portion 14 that is contoured as at 16 to form a mold face for one-half of the outside of a tire tread band. The lower shell 11 has an extension 17 that slidingly receives the wall portion 18 of the upper shell 12. Wall portion 18 is also contoured as at 19 to form the other half of the outside mold surface for the tread band. A hardened ring 20 is fitted on the upper shell to provide a wearing surface.

Axially opposed faces 21 are provided on the upper and lower shells for moving a slug of stock S, placed between such faces, when the mold is closed. The outer surface of core 13 may be made slightly conical to provide a draft for withdrawal of the core, in which case, the lower end of the core, as seen in Fig. 3, will have the smaller diameter. Inlet and outlet ports 23 and 24 are provided in the base 10 so that steam may be admitted to the core at a temperature of about 150° F., such steam being provided to warm the mold and facilitate transfer of the stock but not for purposes of vulcanizing or curing the stock. The two shell parts 11 and 12 are provided with flash cavities 26 to receive any excess stock when the mold is closed.

As seen in Fig. 1, a hydraulic apparatus is provided for opening and closing the mold. Column members 27 extend upwardly from the base plate 10 and support a beam 28 extending across the upper part of the apparatus. A central hydraulic cylinder 29 connects to the mold member 13 by means of a piston rod 31. A pair of cylinders 32 connect to the upper shell member 12 by piston rods 33. These cylinders must be of adequate length so that the upper shell member 12 and the core member 13 can be brought to a position clear of the lower shell member 11 for placing stock in the mold when the core is open, and for removing the annular tread band at the end of the process. To assist in removing the completed tread band, a compressed air manifold 34 and a plurality of air ports 36 are fitted to the lower mold shell.

In operation, the upper shell and core members will be raised by their hydraulic cylinders and a slug of stock S will be slipped into the lower shell member to rest on face 21. The slug may be an extruded piece rectangular in section, it may be a single piece wrapped around until its ends meet or it may be made of two pieces abutted in the mold, or it may be a single piece formed by extruding a tube of the diameter of the mold and cutting lengths of the tube off as required. Alternatively, it may be made as a single endless piece by butt splicing the ends of an extruded rectangular length of stock.

After the stock is placed in the mold, the core member 13 is lowered as seen in Fig. 1. The upper mold shell 12 is next lowered and as seen in Fig. 1 the upper shell is in the position wherein its stock transfer face has just engaged the stock S. It can also be seen that the cavities formed by contoured surfaces 16 and 19 and the outer wall of core 13 are symmetrically presented to the stock.

Fig. 4 shows the mold partially closed and it can be seen that a body of stock 38, disposed between the faces 21, has been reduced in volume and that what might be termed rivers of stock 37 are flowing symmetrically in axially opposite directions. It can also be seen that the presentation of the unfilled portions of the mold cavities remains symmetrical.

Figure 5 shows the mold fully closed with the completed tread band in the mold cavities. Even if the initial slug of stock had not been endless, the high pressure required for the transfer operation, and the fact that the mold is warmed to 150° F. results in the joints merging so that the finished band is in one piece. To remove the band from the mold, the core member is first withdrawn, this member being polished and lubricated, which coupled with the slight draft provided, permits it to be withdrawn without galling the tread band. Compressed air is applied to the air ports in the lower shell member facilitating freeing of the band from that member, so that the upper shell member can be raised and will carry the band with it. The upper shell member is raised high enough so that the depending tread band clears the lower shell member and the core member is raised high enough to clear the upper shell member. The tread band can now be readily removed from the upper shell member and from the apparatus. Since no reverse flow of any consequence has been forced upon the stock during the transfer operation, the removal from the mold can be accomplished without tearing or damaging the tread band. The unvulcanized tread band can be applied to the tire carcass by means known in the art such as a circumferential outside vacuum box or the like.

As the upper mold shell closes the stock that enters the upper mold cavity has a longer path of frictional engagement with the polished core member than does that that enters the lower mold cavity. In order to equalize friction against the core, the core 13a, seen in Figure 6, may be recessed as at 42 to receive an annular cylindrical plate 41 which is centered by springs 43. Since this plate is floating, inequalities in frictional contact of the stock entering the two mold cavities will tend to shift the plate to the position wherein the effects of friction on the stock on each side of the mid-plane thereof are equal, further insuring a uniform product.

Referring to Figure 7, the arrangement for telescoping the upper and lower mold shells is reversed from that of the other figures. The lower mold shell 11a has a wall 14a that telescopes within the upper mold shell 12a. The wall 18a of the upper mold shell is extended in this form as at 44 and is fitted with the wear plate 45 that engages the wall 14a of the lower shell. The mode of operation of the apparatus is like that of Figures 1 to 5. If a draft or taper is applied to the core as mentioned, compensation for the draft may be supplied by properly shaping the contoured surfaces 16 and 19 in the mold shells.

Having completed a detailed description of preferred embodiments of my invention so that others skilled in the art may practice the same, I claim:

1. Apparatus for forming an annular tire tread member of plastic material by stock transfer, said apparatus comprising a multi-part mold, said mold having first and second annular shell portions, said shell portions telescoping and forming an annular stock receiving cavity having axially opposed stock moving faces, a generally cylindrical core slidably fitting, within said telescoped mold shell portions, a mold cavity face formed in each of said mold shell portions at opposite sides of said opposed stock moving faces, said mold cavity faces forming with said core substantially mold cavities disposed at each side of said axially opposed stock moving faces, said mold cavities being axially symmetrical at all relative positions of said shell portions from the position where said opposed stock moving faces first engage the stock to the position where said faces are brought together to their final position to transfer the stock to said cavities in order to greatly reduce reverse stock flow as the telescopic mold shell portions are brought together.

2. Apparatus for forming an annular tire tread member of plastic material by stock transfer, said apparatus comprising a multi-part mold, said mold having first and second annular shell portions, said shell portions telescoping and forming an annular stock receiving cavity having axially opposed stock moving faces, a generally cylindrical core slidably fitting, within said telescoped mold shell portions, a contoured mold cavity face formed in each of said mold shell portions at opposite sides of said opposed stock moving faces, said mold cavity faces forming with said core substantially mold cavities disposed at each side of said axially opposed stock moving faces, said mold cavities being axially symmetrical at all relative positions of said shell portions from the position where said opposed stock moving faces first engage the stock to the position where said faces are brought together to their final position to transfer the stock to said cavities in order to greatly reduce reverse stock flow as the telescopic mold shell portions are brought together, said core having an outer sleeve slidably mounted thereon and spring centered relative to said mold cavities to serve as a floating inner mold cavity surface.

References Cited in the file of this patent
UNITED STATES PATENTS 2,615,203    Du Pree _____ Oct. 28, 1952

FOREIGN PATENTS 718,832    Great Britain _____ Nov. 24, 1954